US008868630B1

United States Patent
Boppana et al.

(10) Patent No.: US 8,868,630 B1
(45) Date of Patent: Oct. 21, 2014

(54) VERIFICATION OF PSEUDORANDOM NUMBER STREAMS

(75) Inventors: Rajendra V. Boppana, San Antonio, TX (US); Ram C. Tripathi, San Antonio, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 324 days.

(21) Appl. No.: 13/423,927

(22) Filed: Mar. 19, 2012

Related U.S. Application Data (60) Provisional application No. 61/454,259, filed on Mar. 18, 2011.

(51) Int. Cl.
*G06F 7/58* (2006.01)

(52) U.S. Cl.
USPC .......................................................... 708/250

(58) Field of Classification Search
None
See application file for complete search history.

(56) References Cited

U.S. PATENT DOCUMENTS

| 8,589,460 | B2* | 11/2013 | Dong | 708/254 |
| 2003/0065691 | A1* | 4/2003 | Schmidt | 708/250 |
| 2003/0236803 | A1* | 12/2003 | Williams | 708/252 |
| 2007/0162806 | A1* | 7/2007 | Matsumoto et al. | 714/728 |
| 2008/0288566 | A1* | 11/2008 | Umeno et al. | 708/250 |
| 2010/0235418 | A1* | 9/2010 | Dong | 708/254 |

* cited by examiner

*Primary Examiner* — David H Malzahn
(74) *Attorney, Agent, or Firm* — Meyertons, Hood, Kivlin, Kowert & Goetzel, P.C.; Eric B. Meyertons (57) ABSTRACT

A method of assessing parallel random number streams includes mixing two or more parallel random number streams. Mixing the parallel random number streams may include pairing at least one of the random number streams with other random number streams. For each mixed random number stream, an inter-stream correlation value may be computed based on a correlation among the random number steams used. A quality metric for the parallel random number streams may be determined from inter-stream correlation values for the two or more mixed streams created from the parallel random number streams. A quality metric for a single random number stream may be computed by segmenting the single random number stream into multiple substreams and applying the methods of mixing streams and computing quality metric in the case of parallel streams.

21 Claims, 3 Drawing Sheets

VERIFICATION OF PSEUDORANDOM NUMBER STREAMS

PRIORITY CLAIM

This application claims priority to U.S. Provisional Application No. 61/454,259 entitled "Verification of Pseudorandom Number Streams" to Boppana et al. filed Mar. 18, 2011, which is incorporated herein by reference in its entirety.

BACKGROUND

1. Field

This disclosure relates to the field of computation. More particularly, this disclosure relates to methods for assessing pseudorandom number streams.

2. Description of the Related Art

Random number generators, which generate streams of seemingly random numbers, are used in many computing applications. An application may use a single stream of random numbers or multiple streams of random numbers simultaneously. A sequential random number generator is designed to generate a single stream of random numbers, the starting point of which may be changed with the initial (seed) value. A parallel random number generator (PRNG) is designed to generate multiple, independent streams of random numbers simultaneously with a simple change in a parameter used to initialize the random number streams.

It is often useful to test a random number generator to assess the quality of the random number stream. Some single-stream statistical test batteries provide pass/fail indication for each test in the battery, since it may not be meaningful to combine the statistical computations from multiple tests to provide an overall quality metric for the RNG (random number generator) tested. Therefore, it is common to use the test results as a multi-bit vector data, with each bit representing the pass/fail status for a test. The statistical test batteries do not provide a single quantitative metric to compare the two generators. This could be a limitation if two RNGs that need to be compared fail different tests.

Single-stream tests may be ineffective for testing the correlations of random numbers among a large number (e.g., thousands to billions) of parallel random number streams since the a typical single-stream test method may operate on blocks of a few thousands of numbers at a time. Typical existing test methods may be considered off-line methods in the sense that the tests are fed with data generated by the random number generator that is being evaluated specifically for test purposes.

Parallel random number streams may be generated by a parameterized family of pseudorandom number generators, by a collection of true random number generators that generate random numbers based on environmental signals such as noise levels and temperature, computing and communication delays, events induced by computer users or other sources, or any combination of the pseudo- and true random number generators. The quality of the random numbers used may be crucial for quick and accurate results from computer-based simulations and for robust security protocols and security keys used in security protocols.

Some methods to test and assess the independence of parallel random number streams are typically based on sequential test methods that are designed to test intra-stream correlations of a single random number stream. One practice for statistical testing of PRNG quality is to generate parallel streams, interleave them to form a single stream, and apply single-stream tests to the interleaved stream. If the interleaved stream passes most or all of the single-stream tests, then the PRNG may be deemed to be of good quality and is accepted for use in applications.

SUMMARY

In an embodiment, a method of assessing parallel random number streams includes mixing two or more parallel random number streams. Mixing the parallel random number streams may include pairing one of the random number streams with one or more of the other random number streams. For each pairing of the parallel random number streams, an inter-stream correlation value may be computed based on a correlation between the two random number streams in the pair. A quality metric for the parallel random number streams is determined from inter-stream correlation values for the pairs of the parallel random number streams.

In an embodiment, a method of assessing quality of a random number stream includes segmenting the random number stream into two or more random number substreams. The random number substreams may be mixed. Mixing the random number substreams may include pairing one of the substreams with one or more of the other substreams. For each pair of the random number substreams, a correlation value may be computed based on a correlation between the random number substreams in the pair. A quality metric for the random number stream is determined from correlation values for the pairs of the random number substreams.

In various embodiments, methods, systems and apparatus are used to test a large number of parallel random number streams and to quantify interstream correlations among them so that their randomness can be assessed. Correlations may be tested among a large number (hundreds to billions) of streams and the computed correlation coefficients may be combined so that the user of a parallel random number generator can assess a priori or dynamically (during the consumption of the random numbers) the quality of random numbers used for his/her application. In some embodiments, an online test is performed of the quality of RN streams as the random numbers are generated by the PRNG for an actual application use.

In some embodiments, an interstream correlation (ISC) test evaluates a large number of parallel RN streams simultaneously and provides a quality metric. The ISC test may divide the total streams to be evaluated into subsets of streams, with at least two streams in each subset, and compute a correlation coefficient for each subset. These correlation coefficients may be combined using a theoretically sound test method such as the Donner and Rosner test (DR test) or Kolmogorov-Smirnov test (KS test), and a test statistic may be obtained. If the test statistic is higher than a suitably determined critical value, the claim of independent RN streams is rejected. A lack of rejection indicates that the RN streams are likely to be independent.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

The following abbreviations and acronyms are used herein.
RN: Random number;
RNG: pseudorandom number generator;
PRNG: parallel pseudorandom number generator;
ISC: interstream correlation;
CPU: central processing unit or processor;
GPU: graphic processing unit or graphics processor used for general purpose array computing;
MC: Monte Carlo simulations.

As used herein, "pairing", in the context of number streams, includes mixing or combining one stream with one or more other streams, or considering or assessing one stream in relation to one or more other streams (for example computing a correlation between two streams). As examples, a pairing may include: (a) pairing a selected stream with another stream, (b) pairing a selected stream with an interleaved stream of two or more other streams, and (c) interleaving a selected stream and one or more other streams.

As used herein, "random number" includes, but is not limited to, a true random number, a pseudorandom number, or a number generated from a combination of true random and pseudorandom number methods. As used herein, a "random number generator" includes, but is not limited to, a pseudorandom number generator.

Figure 1:
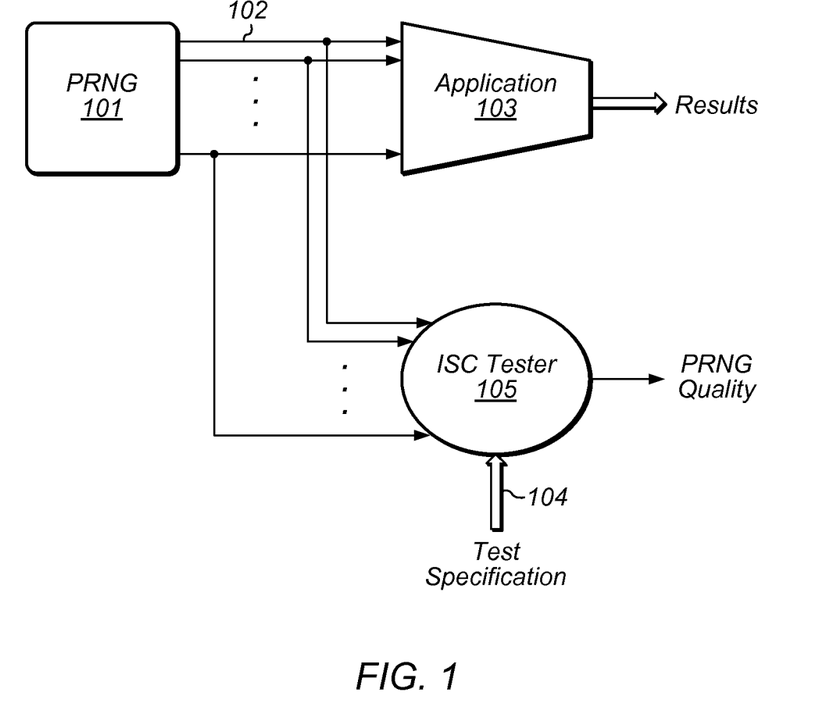
FIG. 1 is an exemplary block diagram illustrating a parallel pseudorandom number generator test metric computation according to one embodiment.

FIG. 1 is an exemplary block diagram illustrating the PRNG test metric computation. In FIG. 1 PRNG 101 is the parallel random number generator that needs to be tested for the independence of its streams 102. Each line may provide a single stream of RNs spaced in time. These RNs may be fed to the application 103 as part of the application's input data. The application 103 may be executed normally and the output of the application may be obtained.

In some embodiments, a parallel random number generator may be part of the application. In such cases, PRNG 101 and Application 103 may be described by a single block feeding ISC Tester 105.

ISC Tester 105 may be fed with RN streams 102 and a test specification. The test specification may specify the interleaving method for mixing the streams and the statistical method that is used for computation of a quality metric.

Figure 2:
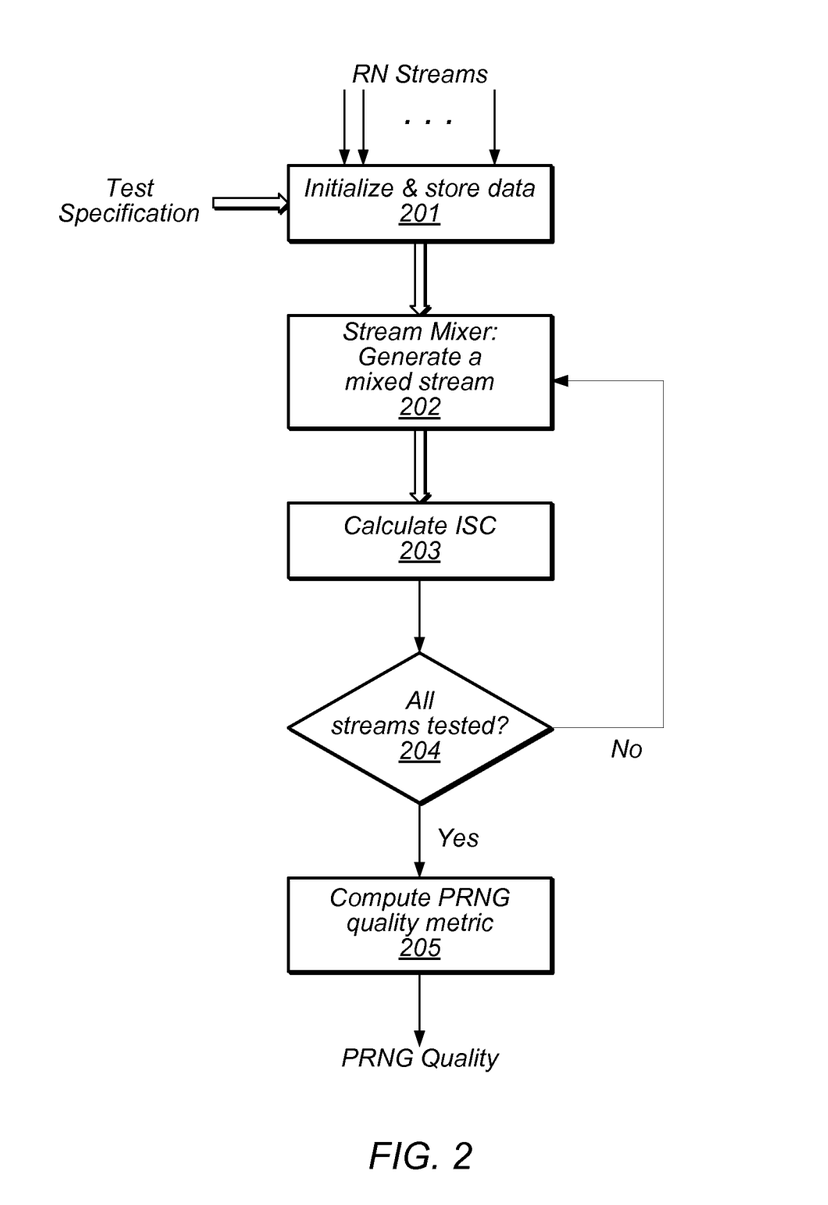
FIG. 2 is an exemplary flow chart of the logic implemented by an inter-stream correlation test according to one embodiment.

FIG. 2 is an exemplary flow chart of logic implemented by an inter-stream correlation test according to one embodiment. ISC Tester 105 may be fed with parallel RN streams and test specification criteria. The initialization and storage unit 201 may ensure that these RNs are available for repeated use during the test method. Based on the specified interleaving, stream mixer program 202 may select a stream and mix it with the remaining streams (if the specification is biased interleaving) or with a subset of the other streams (if the specification is group, shuffled or pairwise interleaving) to create a single stream with RNs from the selected stream occupying the odd numbered positions and the RNs from the other streams occupying the even numbered positions. Stream mixer program may skip the user-specified number of initial RNs from one or more of the streams prior to mixing them. The RNs in the odd numbered positions (positions 1, 3, 5, ...) from the resulting mixed stream may be considered as $x_i$'s and the RNs in the even numbered positions as $y_i$'s. Therefore, the resulting mixed stream may be considered as a sequential stream of ($x_i$; $y_i$) bivariate pairs. This mixed stream may be fed to correlation coefficient computing program 203. Correlation coefficient computing program 203 may calculate inter-stream correlations of the two streams provided to it by the stream mixer 202. The computed correlation coefficient is stored. A tester 204 checks if all the desired combinations of interstream correlations are computed. If there are one or more combinations remain, the stream mixer provides the next stream pair to the correlation coefficient computing program 203. If all desired combinations of stream pairs are examined, then PRNG quality metric 205 is computed. The PRNG quality metric may be computed using, in various embodiments, an aggregation method, a goodness-of-fit method, percentile method or mean absolute deviation method. In some embodiments, the method for computing the PRNG quality metric is based on user specification. In some embodiments, the final output (which may be a p-value in statistics) may be a significance level above which the claim of independence of the parallel streams cannot be rejected. In certain embodiments, the user may specify a significance level, and the quality metric is used to determine if the PRNG meets the user-specified significance level.

Figure 3:
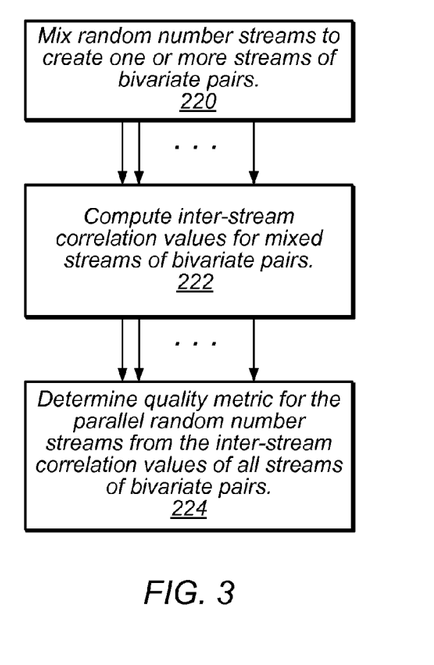
FIG. 3 is a flow diagram illustrating one embodiment of assessing parallel random number streams.

FIG. 3 is a flow diagram illustrating one embodiment of assessing parallel random number streams. In some embodiments, the parallel random number streams are generated by a random number generation system for purposes of evaluating the quality of the random number generation system. This may be described as a priori or offline test. In other embodiments, the quality of parallel random number streams generated on demand by an application is assessed continually while the application is running. This may be described as dynamic, on-the-fly, or online test.

At 220, parallel random number streams may be mixed in one or more ways to create one or more streams of bivariate pairs. Mixing the parallel random number streams may include pairing the random number streams with one another. In some embodiments, a selection of a mixing method to be used for mixing the random number streams is received from a user.

At 222, an inter-stream correlation value may be computed for each mixed stream of bivariate pairs based on a correlation among the random number streams used to create the mixed stream. The correlation values may be, for example, a correlation coefficient computed by taking several (two or more) bivariate pairs from the mixed stream. The number of bivariate pairs used in the correlation value computation may be specified by the user.

At 224, a quality metric for the parallel random number streams may be determined from inter-stream correlation values for the mixed streams. The quality metric may serve as a figure of merit for the parallel random number streams. The quality metric may provide a measure of the independence of the parallel number streams from one another. In some embodiments, a selection of a testing method to be used for computing a quality metric for the random number streams is received from a user. The quality metric may be measured against a significance level specified by a user.

Figure 4:
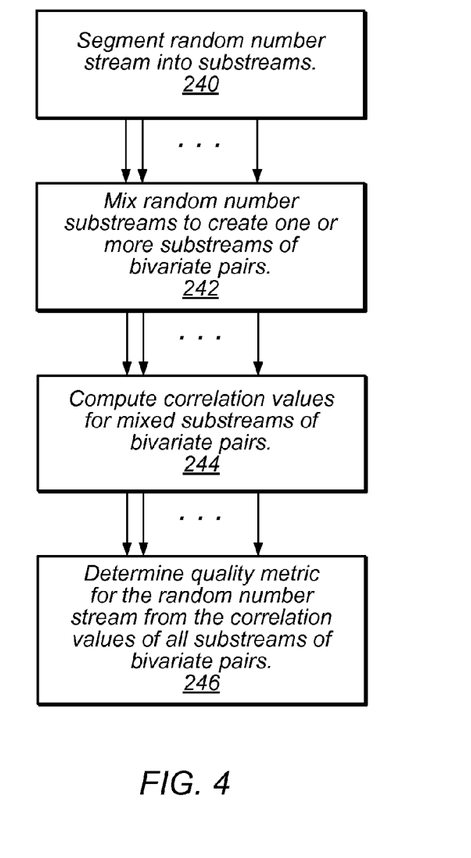
FIG. 4 is a flow diagram illustrating one embodiment of assessing a random number stream.

FIG. 4 is a flow diagram illustrating one embodiment of assessing a random number stream. In some embodiments, the random number stream is generated by a random number generation system for purposes of testing the random number generation system. In other embodiments, the quality of the random number stream is assessed during consumption of the random numbers by an application (online test).

At 240, a random number stream is segmented into random number substreams. In one embodiment, the random number stream is segmented using a leap-frog method. In another embodiment, the random number stream is segmented using a cycle-division method.

At 242, random number substreams may be mixed to form substreams of bivariate pairs. Mixing the random number substreams may include pairing the random number substreams with one another. In some embodiments, a selection of a mixing method to be used for mixing the random number substreams is received from a user.

At 244, an inter-stream correlation value may be computed for each mixed substream of bivariate pairs based on a correlation between the substreams used to create the mixed substreams. The number of bivariate pairs (at least two) used in the correlation value computation may be specified by the user.

At 246, a quality metric for the random number stream may be determined from inter-stream correlation values for the mixed substreams. The quality metric may serve as a figure of merit for the random number stream. The quality metric may serve as a figure of merit for the parallel random number streams. The quality metric may provide a measure of the independence of the parallel number streams from one another. In some embodiments, a selection of a testing method to be used for computing a quality metric for the random number streams is received from a user. The quality metric may be measured against a significance level specified by a user.

In some embodiments, inter-stream correlations are quantified among multiple parallel random number (RN) streams as a numerical factor, and a figure of merit is assigned for a PRNG. In one embodiment, a system includes three main components: stream mixer 202, correlation coefficient calculator 203, and PRNG quality metric calculator 205.

Let us consider k, where k≥2, RN streams $S_1, S_2, \ldots, S_k$ for which we need to check if there is a significant inter-stream correlation (ISC) among them. To compute the correlation, we construct a bivariate sample (X,Y) given by $(x_i, y_i)$, i=1, 2, ..., n. (It is common to use capitalized letters for random variables and lower case letters with appropriate subscripts for the observed samples corresponding to the random variables.) A straight-forward bivariate sampling takes two RN streams at a time; but this results in $$\frac{k(k-1)}{2}$$

possible bivariate samples, in which each bivariate sample shares one of the streams with 2(k−2) other bivariate samples, or $$\frac{k}{2}$$

bivariate samples, in which no streams are shared among the bivariate samples. If k=10,000, then the number of bivariate samples we need to analyze to capture all possible correlations will be nearly 50 million. To reduce the computational complexity, we construct k or fewer bivariate samples in which each RN stream is checked for correlation with one or more of the other RN streams. This is explained in the following steps.

Step 1. Mix the RN Streams in one of the Following Ways

Biased Interleaving:
Use n numbers from $S_1$ as the n observations on the X variate, and interleave the remaining k−1 streams to provide n observations on the Y variate.

(An alternative approach is to use coarse interleaving of the k−1 streams. Let n be a large multiple of (k−1). Take the first n RNs from $S_1$ to form the n observations on X. Take first $$\frac{n}{k-1}$$

RNs from $S_2$, the second $$\frac{n}{k-1}$$

RNs from $S_3$ and so on to form n values on Y. Extensive testing showed that both methods of interleaving give statistically similar results. The first approach is oblivious to the total number of RNs to be generated by each stream, which may simplify the generation and storage of the random numbers.)

This gives $(x_i, y_i)$, i=1, 2, ..., n, with $S_1$ as the selected stream. This can be repeated with $S_i$, i=2, ..., k, as the selected stream providing X values and $$\frac{n}{k-1}$$

RNs from each of the other k−1 streams providing Y values. In this method, each (X,Y) bivariate sample shares (overlaps)

$$\frac{n(k-2)}{k-1}$$

of its Y values with each of the other bivariate samples.

Group Interleaving:
This method of mixing the RN streams extends the concept of biased interleaving to form bivariate samples with no overlap, which may be desirable for statistical test methods. In this method, the given k RN streams are grouped into groups of h streams each, where 2≤h≤k. There will be g groups, where $$g = \left\lfloor \frac{k}{h} \right\rfloor.$$

Therefore, group interleaving uses gh streams for correlation calculations. (If h does not divide k evenly without any remainder, then gh<k<gh+h.) Using the streams in each group, a bivariate sample is formed as follows. One of the streams from the group is selected to provide n observations of the X variate. The remaining h−1 streams are interleaved to provide n values for the Y variate; each of these streams provides up to $$\left\lceil \frac{n}{h-1} \right\rceil$$

random numbers. (As indicated earlier, fine or coarse interleaving may be used to interleave the h−1 streams.) This gives g bivariate samples each with n observations. There is no sharing of random numbers among the bivariate samples.

Shuffled Interleaving:

This method is a variation of group interleaving, obtained by interleaving all streams of the group evenly and taking the values in the odd-numbered positions forming the X variate and values in the even numbered positions forming the Y variate. Shuffled interleaving also produces g different (X,Y) stream pairs with no overlapping. For the special case of h=k, there is only one group resulting in only one (X,Y) bivariate sample; this special case is the state of the art for statistical testing of interstream correlations.

Pairwise Interleaving:

A special case of group interleaving (and shuffled interleaving) is the pairwise interleaving, which is obtained by choosing h=2; each group is a pair of streams. Therefore, pairwise interleaving uses n RNs from stream $S_1$ as the n observations of the X variate and n RNs from $S_2$ as the observations of the Y variate from the first group. This again gives $(x_i, y_i)$, i=1, 2, . . . , n. This can be repeated to obtain up to $$\left\lfloor \frac{k}{2} \right\rfloor - 1$$

additional pairs with stream $$S_i, i = 2, 4, \ldots, 2\left\lfloor \frac{k}{2} \right\rfloor - 1,$$

providing X values and stream $S_{i+1}$ providing Y values.

Step 2. Calculate Correlation of X,Y Streams

Consider a pair of values $(x_i, y_i)$, i=1, 2, . . . , n, taken one each from the two streams. If the RNs are integers in the range [0, m−1], then they are converted to reals in the range (0,1] using the conversion $$1 - \frac{RN}{m},$$

where RN is an integer random number. If the RNs are from uniform [0, 1), then they are converted to (0, 1] range using the conversion 1−RN. If the RNs are from uniform (0,1) distribution, no additional preprocessing is needed. Let the resulting random variates be denoted $ux_i$ and $uy_i$. The Box-Muller transform given by the following equations is applied to convert RNs to normal random variates, $zx_i$ and $zy_i$. (All logarithms are to the base e.)

$$r^2 = -2 \log(ux_i) \quad (1)$$

$$\theta = 2\pi uy_i \quad (2)$$

$$zx_i = r \cos \theta \quad (3)$$

$$zy_i = r \sin \theta \quad (4)$$

The correlation coefficient of the bivariate normal pairs $(zx_i, zy_i)$, i=1, 2, . . . , n, is computed.

The Box-Muller transform is not symmetric in the sense that switching (X,Y) ordering yields a different correlation coefficient value. In particular, Box-Muller transform is sensitive to the RN streams used for Y variates and amplifies the correlations among the RN streams used for Y variates to calculate different θ's. If the selected stream is used to draw observations for X and the interleaved stream is used to draw observations for Y with biased interleaving, then Box-Muller transform correctly amplifies the correlation among the different versions of the interleaved streams used for Y. Any pair of interleaved streams formed by biased-interleaving share $$\frac{n(k-2)}{k-1}$$

values, and the quality metric computed in the next step is dominated by the correlation among the interleaved streams. To avoid this, since the purpose of ISC test is to find correlations among different individual streams, the interleaved stream should be used for the observations of X and the selected stream for the observations of Y when biased interleaving is used to mix RN streams. For group, shuffled, and pairwise interleaving the order of the streams is not an issue since all streams used for X and Y variates are independent.

Correlation coefficients from several pairs of streams generated using the biased interleaving are obtained. Let these coefficients be denoted $r_1, r_2, \ldots, r_k$. Each $r_i$ gives the interstream correlations from a selected stream to the rest of the streams.

If group or shuffled interleaving is used, $r_1, r_2, \ldots, r_g$, where $$g = \left\lfloor \frac{k}{h} \right\rfloor$$

and h is the group size, are the interstream correlations with $r_i$ representing the correlation coefficient between streams $S_{ih}$, $S_{ih+1}, \ldots, S_{ih+h-1}$. For the special case of pairwise-interleaving, $$r_1, r_2, \ldots, r_{\left\lfloor \frac{k}{2} \right\rfloor}$$

are the interstream correlations, where $r_i$ represents the correlation coefficient between streams $S_{2i}$ and $S_{2i+1}$.

(Alternatively, the polar transform may be used to convert $(x_i, y_i)$ pairs to normal random variate pairs. First, $x_i$ and $y_i$ are converted to reals in the range (−1, 1). If the RNs are integers, they can be converted into reals in the range (−1,1). If the RNs are from uniform (0,1) distribution, then the numbers are extended to (−1,1) range. Let these be denoted $ux_i$ and $uy_i$. If $ux_i^2 + uy_i^2 \geq 1$, the $(x_i, y_i)$ pair is rejected and another pair from the streams is chosen and tested for suitability. This is repeated until a suitable pair is found. The processed values $ux_i$ and $uy_i$ of $(x_i, y_i)$ pair that is found suitable are used to compute the corresponding normal random variates pair using the following equations.

$$s = \sqrt{ux_i^2 + uy_i^2} \quad (5)$$

$$zx_i = ux_i \sqrt{\frac{-2\log(s)}{s}} \quad (6)$$

$$zy_i = uy_i \sqrt{\frac{-2\log(s)}{s}} \quad (7)$$

Since it rejects RN pairs that are simultaneously too large or too small, ISC testing based on the polar transform may result in the underestimation of the actual inter-stream correlations. Therefore, polar transform is not recommended for ISC testing and the computation of PRNG quality metric. However, the polar transform may be used to reduce the correlations between a given pair of RN streams by removing RN pairs that result in $s \geq 1$.)

Step 3. Compute the Overall Interstream Correlation Metric

The sequence of r's obtained in the previous step denote $$k \left(\text{or } \frac{k}{2} \text{ if pairwise-interleaving is used}\right)$$

if pairwise-interleaving is used) estimates of the actual correlation coefficient $\rho$ among the streams converted using the Box-Muller transform. The RNG quality metric may be obtained by converting the r's to normal variates using Fisher's z-transformation and using one of the following correlation-coefficient combining methods described below.

3.1. Aggregation Method

Let $r_i$, $i=1, \ldots, k$, be a correlation coefficient based on $n_i$ bivariate pairs. In the present disclosure, $n_1 = n_2 = \ldots = n_k = n$. Let $N = kn$.

Define $$Z_i = \frac{1}{2} \log\left(\frac{1+r_i}{1-r_i}\right). \quad (8)$$

Let $$\overline{Z}_W = \frac{\sum_{i=1}^{k}(n_i - 3)Z_i}{\sum_{i=1}^{k}(n_i - 3)}. \quad (9)$$

An estimate of the common correlation $\rho$ is $$r_F = \tanh(\overline{Z}_W) = \frac{e^{2Z_W} - 1}{e^{2Z_W} + 1}. \quad (10)$$

An alternative expression for $r_F$ in terms of the $r_i$ is $$r_F = \frac{\prod_{i=1}^{k}(1+r_i)^{c_i} - \prod_{i=1}^{k}(1-r_i)^{c_i}}{\prod_{i=1}^{k}(1+r_i)^{c_i} + \prod_{i=1}^{k}(1-r_i)^{c_i}}, \quad (11)$$

with $$c_i = \frac{n_i - 3}{N - 3k}, i = 1, 2, \ldots, k.$$

For the case of equal sample size, $$c_i = \frac{1}{k},$$

and the following bias-corrected transform $$\overline{Z}_H = \overline{Z}_W - \frac{r_F}{2n - \frac{9}{2}} \quad (12)$$

may be used to estimate $\rho$ by $$r_H = \tanh(\overline{Z}_H) = \frac{e^{2Z_H} - 1}{e^{2Z_H} + 1}. \quad (13)$$

We can use the statistic $t_H = \overline{Z}_H \sqrt{N - 3k}$ to test the hypothesis: $H_0$: $\rho = 0$. Under the null hypothesis $H_0$, $t_H$ has an asymptotic standard normal distribution. This gives a significance level above which the null hypothesis cannot be rejected. This significance level can be used to determine the quality of the PRNG.

3.2. Percentile Method

To compute the quality metric, a significance level $\alpha$ is chosen and $r_h = r_{1-\alpha/2}$ and $r_l = r_{\alpha/2}$ quantile values are taken from the sorted sequence of r's. The Fisher's z-transformation given by the following equation is applied to both quantiles to obtain $Z_h$ and $Z_l$.

$$Z_i = \frac{0.5 \log\left[\frac{1+r_i}{1-r_i}\right]}{(1/\sqrt{n-3})}, i \text{ is } h \text{ or } l. \quad (14)$$

The quality of the PRNG is given by the significance level at which $Z_h < 2.33$ and $Z_l > -2.33$, where 2.33 is the 99th percentile (0.99 quantile) for the standard normal random variable.

Alternatively, the significance level for the selection of r quantiles may be fixed and the significance level at which $Z_h$ and $Z_l$ satisfy the corresponding Z-quantiles may be taken as a PRNG quality metric.

3.3. Goodness-of-Fit Method

Kolmogorov-Smirnov (KS) test is a goodness-of-fit test method that may be used instead of the aggregate method to determine the correlation among the RN streams in consideration. The method is applied as follows. Each $r_i$, $1 \leq i \leq k$, is converted to standard normal variates using the Fisher's z-transform described above and sorted in ascending order to obtain $z_i$, $i=1, \ldots, k$. For each $z_i$, the corresponding cumulative probability, $f_i$, is computed. If $r_i$'s are normally distributed, then the cumulative probabilities will be uniformly spaced in the interval [0, 1]. The KS test statistic, D, the maximum deviation of $f_i$, $i=1, \ldots, k$ from a true uniform distribution, is computed as follows.

$$D = \mathop{MAX}_{1 \leq i \leq k} \left\{ f_i - \frac{i-1}{k}, \frac{i}{k} - f_i \right\} \quad (15)$$

If D is below the critical value for a given significance level, then the hypothesis that $r_i$'s are normally distributed cannot be rejected at that significance level. The critical values for KS test precomputed for various significance levels are given in most standard books on statistics.

3.4. Mean Absolute Deviation Method

Let $r_q$ be the q-quantile value in the sorted sequence of $r_i$'s. Also, let $r_{q1}, r_{q2}, \ldots, r_{qm}$ be m $r_i$'s selected at quantiles q1, ..., qm, from this sequence. Using Fisher's z-transform above, the corresponding standard normal values $z_{q1}, z_{q2}, \ldots, z_{qm}$ are computed. From these, the corresponding cumulative probabilities for the z values are computed; let they be $f_{q1}, f_{q2}, \ldots, f_{qm}$. The mean absolute deviation is computed using the following equation.

$$E = \sum_{1 \leq i \leq m} \frac{|f_{qi} - qi|}{m} \quad (16)$$

There is no critical value against which E can be compared. The lower the value E, the better. Though KS test requires more computations, it is a more thorough test and should be preferred to the mean absolute deviation test. On the other hand, for on-the-fly testing of very long RN streams, the mean absolute deviation method may be more practical to implement.

Application of ISC Test to a Single Stream

In some embodiments, an ISC test may be used to determine intra-stream correlations as follows. A single stream may be segmented into k substreams by leap-frog or cycle-division methods, or by any other method. In the leap-frog method, substream i, $1 \leq i \leq k$ consists of RNs in positions i, k+i, 2k+i ... of the stream. In the cycle-division method, k pairwise disjoint subsets, each containing n consecutive RNs of the original single RN stream are picked. An ISC test can be applied on the substreams to obtain the quality metric as in the case of parallel RN streams. In this case, however, the ISC test gives the quality metric based on the intrastream correlations.

In some embodiments, an interstream correlation (ISC) test evaluates a large number of parallel RN streams simultaneously and provides a quality metric. The ISC test may divide the total streams to be evaluated into subsets of streams, and compute a correlation coefficient for each subset. These correlation coefficients may be combined using a theoretically sound test method such as the Donner and Rosner test (DR test) or Kolmogorov-Smirnov test (KS test), and a test statistic may be obtained. If the test statistic is higher than a suitably determined critical value, the claim of independent RN streams is rejected. A lack of rejection indicates that the RN streams are likely to be independent.

In some embodiments, an interstream correlation test evaluates correlations among a large number of RN streams. Using a test method such as the Donner and Rosner test or the Kolmogorov-Smirnov test, the interstream correlation test may provide an overall PRNG quality metric. In some embodiments, results of an interstream correlation test are used in conjunction with other single-stream test batteries and application-based tests. The test may be used to evaluate interstream correlations among billions of RN streams.

In an embodiment, an interstream correlation test evaluates the correlations among a large number of subsets. The subsets may be interleaved using shuffled or biased interleaving method. As one example, three RN streams A, B and C may be considered with RNs $a_1, a_2, a_3, \ldots, b_1, b_2, b_3, \ldots$, and $c_1, c_2, c_3, \ldots$, respectively. In shuffled interleaving (also called perfect shuffle interleaving), a new stream $a_1, b_1, c_1, a_2, b_2, c_2, a_3, \ldots$ is created. In biased interleaving, $a_1, b_1, a_2, c_1, a_3, b_2, a_4, \ldots$ is created. The RNs in the odd numbered positions form the X variates and the RNs in the even numbered positions form the Y variates to create bivariate pairs. These may be transformed into bivariate normal pairs using Box-Muller transform. Correlation coefficient, r, for the bivariate normal pairs is computed. This may be repeated several times to obtain multiple r's. Collectively, these r's are the samples that can be used to estimate ρ, the true common correlation coefficient among the parallel RN streams generated by the PRNG being evaluated.

The r's may be combined using a theoretically sound test method such as Donner and Rosner test (DR-test) or Kolmogorov-Smirnov test (KS-test). Based on the test data, a test statistic may be obtained. For purposes of this example, the statistic for DR-test is denoted as $t_H$ and the statistic for KS-test as $D_{max}$. For each test, there may be a critical value that is computed based on the desired significance level and the number of r's used. For example, for DR-test at a significance level of 0.05, the critical value may be 1.96 provided the number of bivariate pairs used to calculate each r is large and the number of r's is more than 2. If test statistic is above the critical value, then the RN streams generated by the PRNG are likely to have significant interstream correlations.

In this example, the DR-test combines the r's and gives the test statistic $t_H$, which is a standard normal variate. This can be used to test the null hypothesis $H_0$:ρ=0. Large absolute values of $t_H$ will lead to the rejection of the null hypothesis and the acceptance of the alternative hypothesis $H_1$:ρ≠0. For the significance level α=0.05, absolute values of $t_H$ above 1.96 lead to the rejection of the claim that parallel RN streams are independent. The probability that the rejection is erroneous is α=0.05. One could use different significance levels: for α=0.02, the absolute values of $t_H$ above 2.33 will lead to rejection of the claim of independence of RN streams with only 0.02 probability of being wrong.

The distribution of r's may be approximately normal. These r's can be converted into standard normal variates using sample variance of r's, testing for ρ=0. The KS test may be applied on the distribution of r's. In this case, the KS-test statistic, $D_{max}$, computed using the r's is to be less than the critical value, $D_{\alpha,n}$, for significance level α and n, the number of r's used. For KS-test, at a significance level of 0.01, the critical value may be 0.0274 when the number of r's used is 1500.

In some embodiments, r's may be combined using other computationally more complex tests such as Anderson-Darling or Shapiro-Wilk tests.

In some embodiments, r's may be combined using computationally simpler tests such as the percentile method and mean absolute deviation method. The simpler methods may be preferred for online tests to reduce the use of computing resources used for quality metric computations, whereas the more complex methods may be preferred for offline tests.

Systems and methods described herein may be used in a variety of applications. Examples of applications for systems and methods as described herein include (a) simulation-based solutions to large scientific and engineering problems, (b) parameterized Monte Carlo simulations of scientific, engineering, and finance problems, (c) distributed computing, and (d) protocols and keys used for information assurance and security.

Systems and methods described herein, such as the ISC tester described above relative to FIG. 1, may be implemented in hardware including field programmable gate arrays (FPGAs) and application specific integrated circuit (ASIC) chips, or a suitable combination of hardware and software and which can be one or more software systems on a general purpose processor (CPU) or graphics processing unit (GPU).

Computer systems may, in various embodiments, include components such as a CPU with an associated memory medium such as Compact Disc Read-Only Memory (CD-ROM). The memory medium may store program instructions for computer programs. The program instructions may be executable by the CPU. Computer systems may further include a display device such as monitor, an alphanumeric input device such as keyboard, a directional input device such as mouse, a voice recognition system to dictate text and issue commands for processing, and a touch screen that may serve as a keyboard or mouse. Computer systems may be operable to execute the computer programs to implement computer-implemented systems and methods. A computer system may allow access to users by way of any browser or operating system.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive (which may be a disk or solid state), or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network. In some embodiments, a computer system at a respective participant location may include a memory medium(s) on which one or more computer programs or software components according to one embodiment may be stored. For example, the memory medium may store one or more programs that are executable to perform the methods described herein. The memory medium may also store operating system software, as well as other software for operation of the computer system.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, as a library or standalone programs in a programming language such as C, C++, Java or in a scripting language such as Bash, Perl, Python, or AWK, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

The ISC Tester may be embedded in an application or may be combined with a random number generator.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of assessing parallel random number streams, comprising:
    creating mixed random number streams by mixing two or more parallel random number streams, wherein mixing the two or more parallel random number streams comprises pairing at least one of the random number streams with at least one other of the random number streams;
    computing, by a computer system, for each of the mixed random number streams, an inter-stream correlation value based on a correlation between the bivariate pairs constructed from the mixed stream; and
    determining, from inter-stream correlation values for two or more mixed random number streams, a quality metric for the parallel random number streams.

2. The method of claim 1, wherein determining the quality metric comprises off-line testing of the two or more parallel random number streams, wherein the two or more parallel random number streams are generated by a random number generation system for purposes of testing the random number generation system.

3. The method of claim 1, wherein determining the quality metric comprises on-line testing of the two or more parallel random number streams during consumption of the random numbers by an application.

4. The method of claim 1, wherein determining the quality metric comprises combining inter-stream correlation values for at least two random number streams.

5. The method of claim 1, wherein mixing two or more parallel random number streams comprises receiving a user selection of a mixing approach.

6. The method of claim 1, wherein the set of all streams may be mixed.

7. The method of claim 1, wherein the set of all streams may be grouped into subsets.

8. The method of claim 1, wherein mixing a set or subset of three or more parallel random number streams comprises biased interleaving of a stream with the remaining streams in the set or subset.

9. The method of claim 1, wherein mixing a set or subset of two or more parallel random number streams comprises shuffled interleaving of all streams in the set or subset.

10. The method of claim 1, wherein mixing a set or subset of two parallel random number streams comprises pair-wise interleaving of at the two streams.

11. The method of claim 1, wherein determining the quality metric comprises receiving a user selection of a test method.

12. The method of claim 1, wherein the quality metric comprises a significance level, wherein the significance level comprises a level above which a claim of independence cannot be rejected.

13. The method of claim 1, wherein the quality metric is tested against a user-specified significance level.

14. The method of claim 1, wherein the quality metric is determined based on an aggregate method.

15. The method of claim 1, wherein the quality metric is determined based on a goodness-of-fit method.

16. The method of claim 1, wherein the quality metric is determined based on a percentile method.

17. The method of claim 1, wherein the quality metric is determined based on a mean absolute deviation method.

18. The method of claim 1, further comprising applying a polar transform to remove some bivariate pairs from a mixed random number stream from the determination of the quality metric, wherein removing the one or more bivariate pairs reduces correlations among the random number streams used in creating the mixed random number stream.

19. The method of claim 1, further comprising determining whether the quality metric for the two or more parallel random number streams meets a user-specified significance level.

20. A system, comprising:
a processor;
a memory coupled to the processor, wherein the memory comprises program instructions executable by the processor to implement:
creating mixed random number streams by mixing two or more parallel random number streams, wherein mixing the two or more parallel random number streams comprises pairing at least one of the random number streams with at least one other of the random number streams;
computing, for each of the mixed random number streams, an inter-stream correlation value based on a correlation between the bivariate pairs constructed from the mixed stream; and
determining, from inter-stream correlation values for two or more mixed random number streams, a quality metric for the parallel random number streams.

21. A non-transitory, computer-readable storage medium comprising program instructions stored thereon, wherein the program instructions are configured to implement:
creating mixed random number streams by mixing two or more parallel random number streams, wherein mixing the two or more parallel random number streams comprises pairing at least one of the random number streams with at least one other of the random number streams;
computing, for each of the mixed random number streams, an inter-stream correlation value based on a correlation between the bivariate pairs constructed from the mixed stream; and
determining, from inter-stream correlation values for two or more mixed random number streams, a quality metric for the parallel random number streams.

* * * * *